US010316818B2

(12) United States Patent
Caruso et al.

(10) Patent No.: US 10,316,818 B2
(45) Date of Patent: Jun. 11, 2019

(54) THERMOSET COMPONENT HAVING A WELDABLE THERMOPLASTIC INTERFACE

(71) Applicant: General Electric Company, Schenectady, NY (US)

(72) Inventors: Christopher Daniel Caruso, Greenville, SC (US); Aaron A. Yarbrough, Greenville, SC (US); Daniel Alan Hynum, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 504 days.

(21) Appl. No.: 15/075,303

(22) Filed: Mar. 21, 2016

(65) Prior Publication Data

US 2017/0268479 A1   Sep. 21, 2017

(51) Int. Cl.
*B29C 70/02* (2006.01)
*F03D 1/06* (2006.01)
*B29D 99/00* (2010.01)

(52) U.S. Cl.
CPC .......... *F03D 1/0675* (2013.01); *B29C 70/021* (2013.01); *B29D 99/0025* (2013.01); *F05B 2280/6003* (2013.01); *Y02E 10/721* (2013.01); *Y02P 70/523* (2015.11)

(58) Field of Classification Search
None
See application file for complete search history.

(56) References Cited

U.S. PATENT DOCUMENTS

| 5,108,262 | A * | 4/1992 | Crane ................... B64C 11/20 416/224 |
| 6,206,235 | B1 * | 3/2001 | Green ................ B65D 83/0409 221/204 |
| 6,264,877 | B1 | 7/2001 | Pallu De La Barriere |
| 6,341,747 | B1 * | 1/2002 | Schmidt ............... B64C 11/205 244/121 |
| 7,237,751 | B2 * | 7/2007 | Anning ................ B64C 11/205 244/117 R |
| 8,317,479 | B2 | 11/2012 | Vronsky et al. |
| 8,657,581 | B2 | 2/2014 | Pilpel et al. |
| 8,673,106 | B1 | 3/2014 | Jolley et al. |

(Continued)

FOREIGN PATENT DOCUMENTS

| CN | 101906251 | 8/2010 |
| JP | 2007-92716 | 4/2007 |

(Continued)

*Primary Examiner* — Monica A Huson
*Assistant Examiner* — Kelsey C Grace
(74) *Attorney, Agent, or Firm* — Dority & Manning, P.A.

(57) ABSTRACT

The present disclosure is directed to a method for manufacturing a thermoset component having a weldable thermoplastic interface. The method includes forming a polymerized thermoplastic component having a removable protective layer on a portion thereof. Another step includes placing a plurality of dry plies and the thermoplastic component into a mold of the thermoset component with the removable protective layer facing an outer surface of the thermoset component mold. Thus, the method further includes co-infusing the dry plies and thermoplastic component with a resin material so as to form the thermoset component having a weldable thermoplastic interface.

16 Claims, 8 Drawing Sheets

(A)

(B)

(C)

(D)

(56) References Cited

U.S. PATENT DOCUMENTS

| | | | |
|---|---|---|---|
| 8,747,098 | B1 | 6/2014 | Johnson et al. |
| 8,961,142 | B2 * | 2/2015 | Wansink ............ B29D 99/0025 |
| | | | 416/224 |
| 8,992,813 | B2 | 3/2015 | Robbins et al. |
| 2009/0148300 | A1 | 6/2009 | Driver et al. |
| 2011/0097211 | A1 | 4/2011 | Rudling |
| 2013/0164133 | A1 | 6/2013 | Grove-Nielsen |
| 2013/0241117 | A1 * | 9/2013 | Lind .................... B29C 70/443 |
| | | | 264/511 |
| 2014/0295187 | A1 | 10/2014 | Jacobsen et al. |

FOREIGN PATENT DOCUMENTS

| | | |
|---|---|---|
| WO | WO 2010/025830 A2 | 3/2010 |
| WO | WO 2011/088835 A2 | 7/2011 |
| WO | WO 2011/098785 A2 | 8/2011 |
| WO | WO 2015/015202 A1 | 2/2015 |

\* cited by examiner

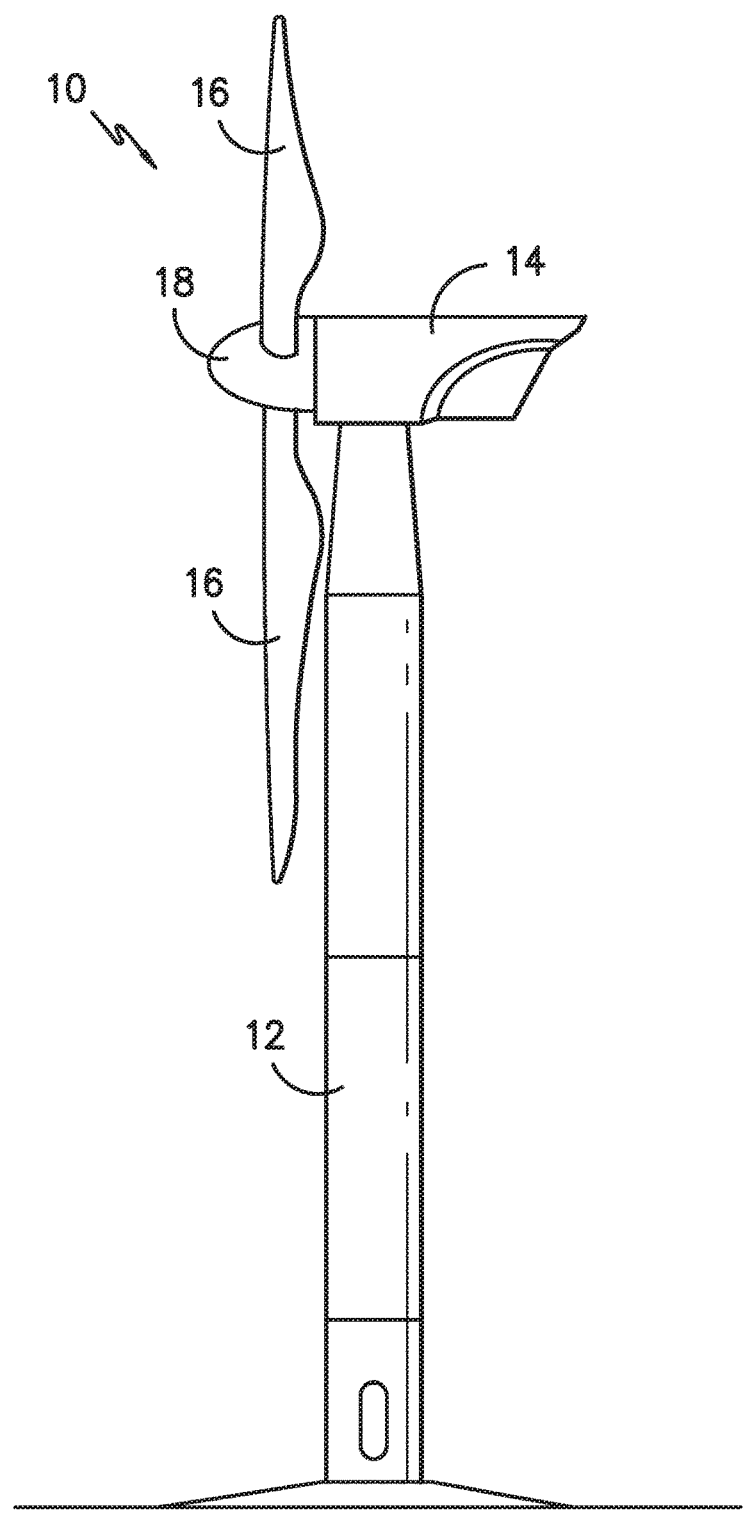
FIG. -1-

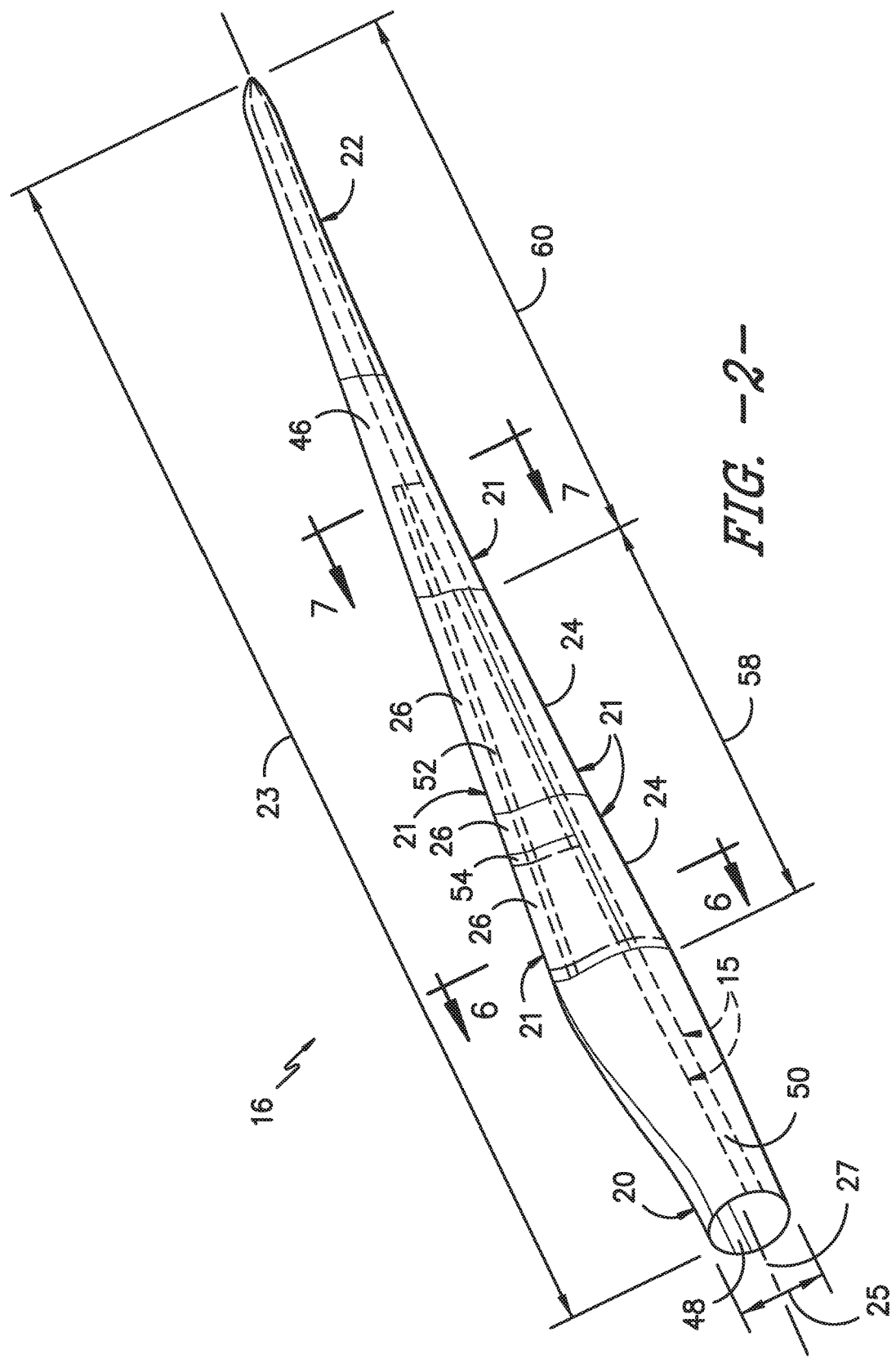

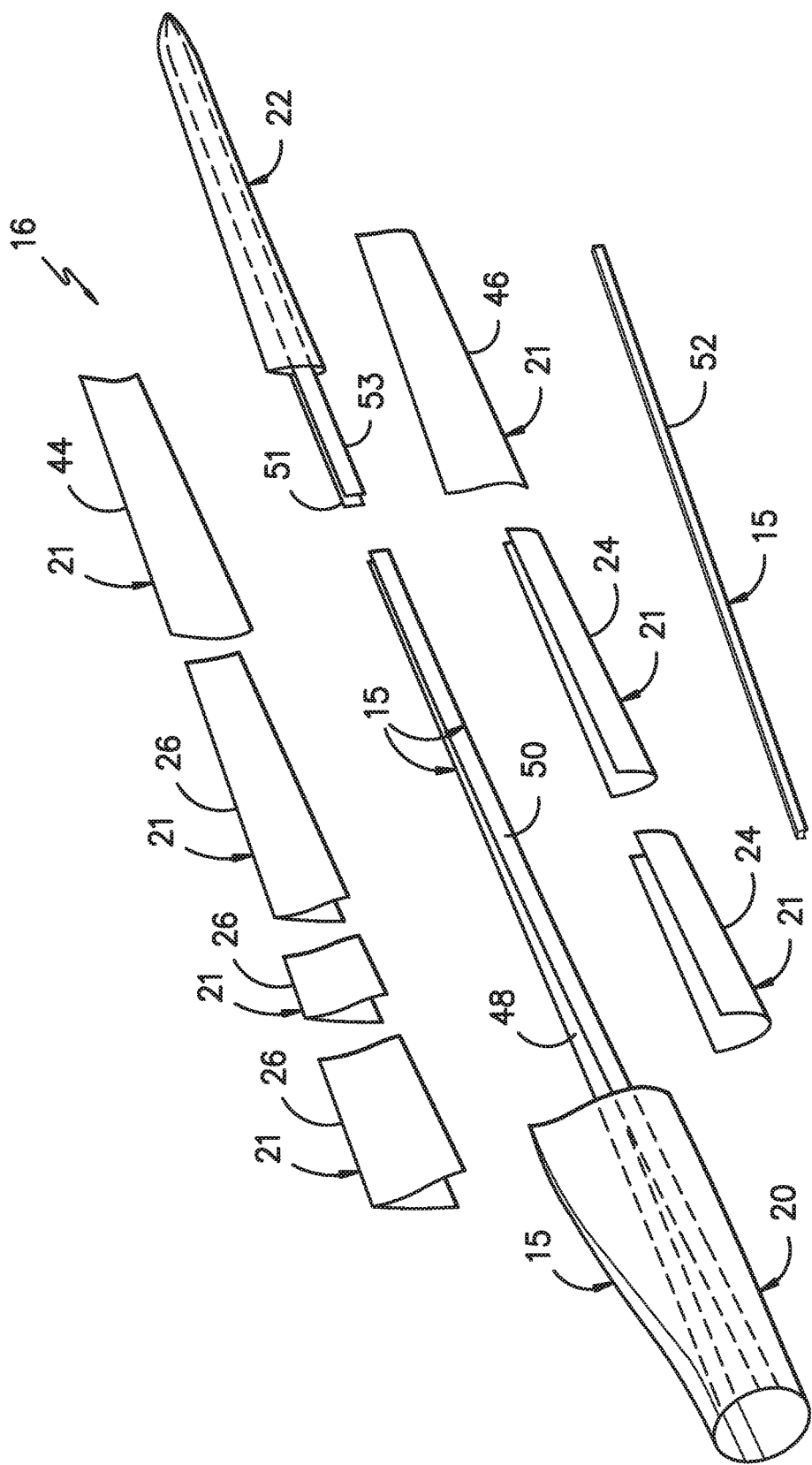
FIG. -3-

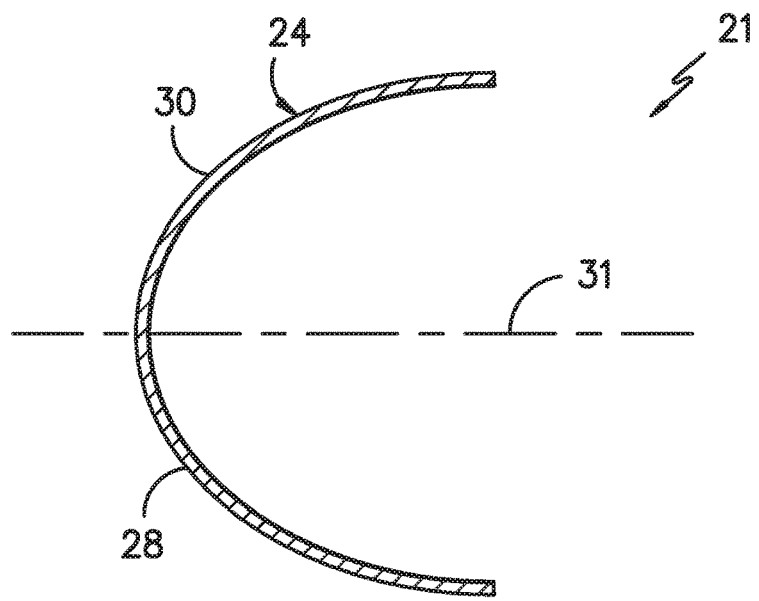
FIG. -4-
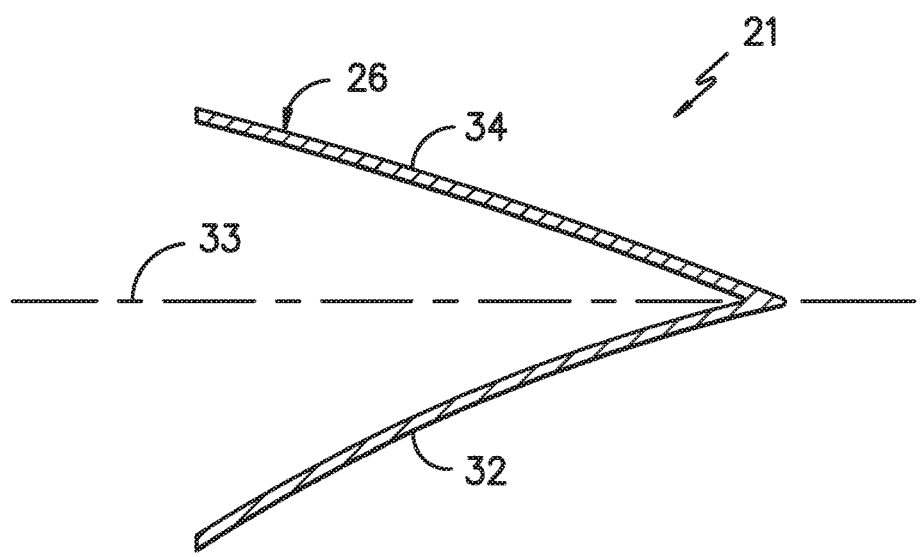
FIG. -5-

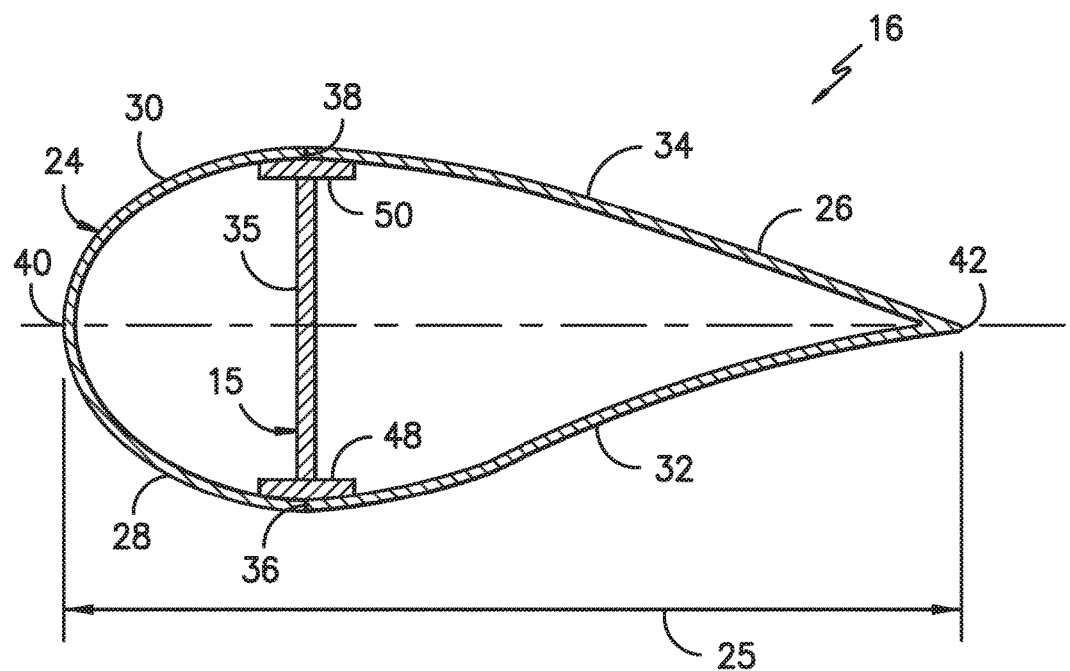
FIG. -6-
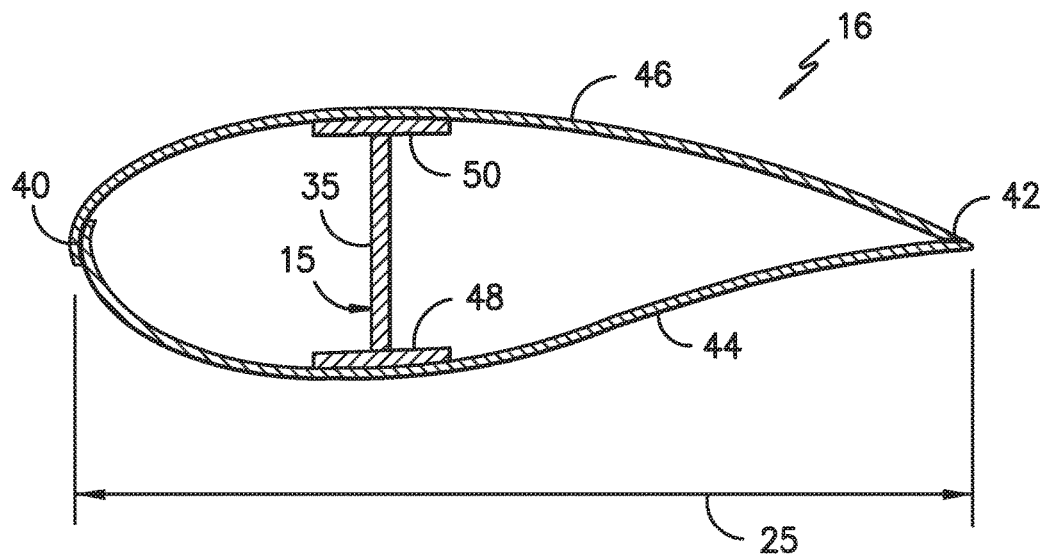
FIG. -7-

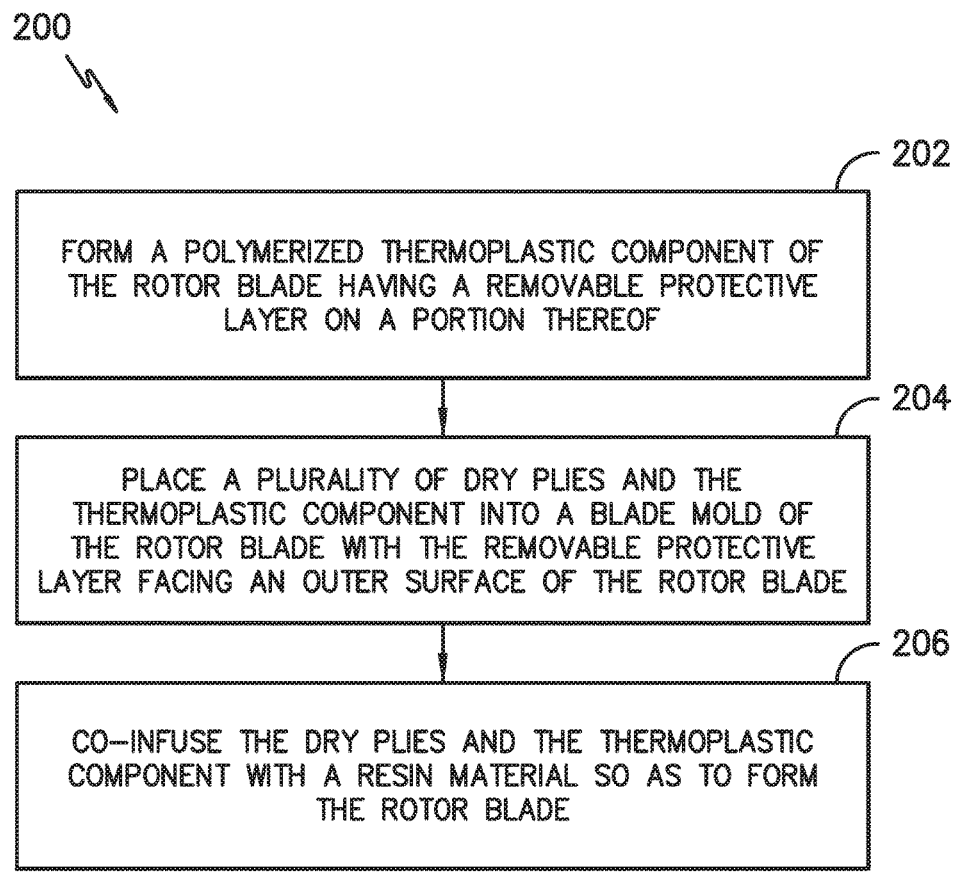
FIG. -8-

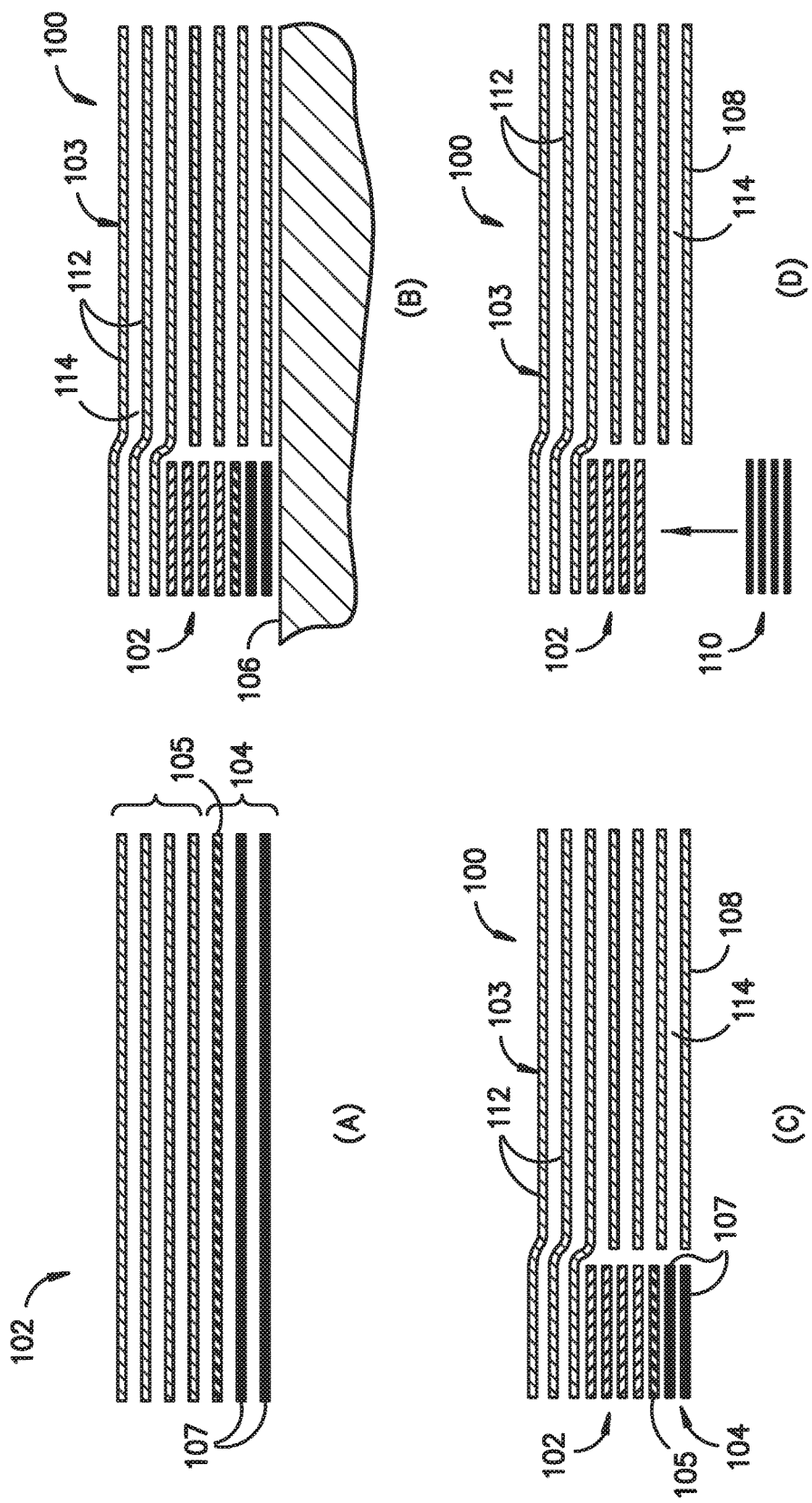
FIG. -9-

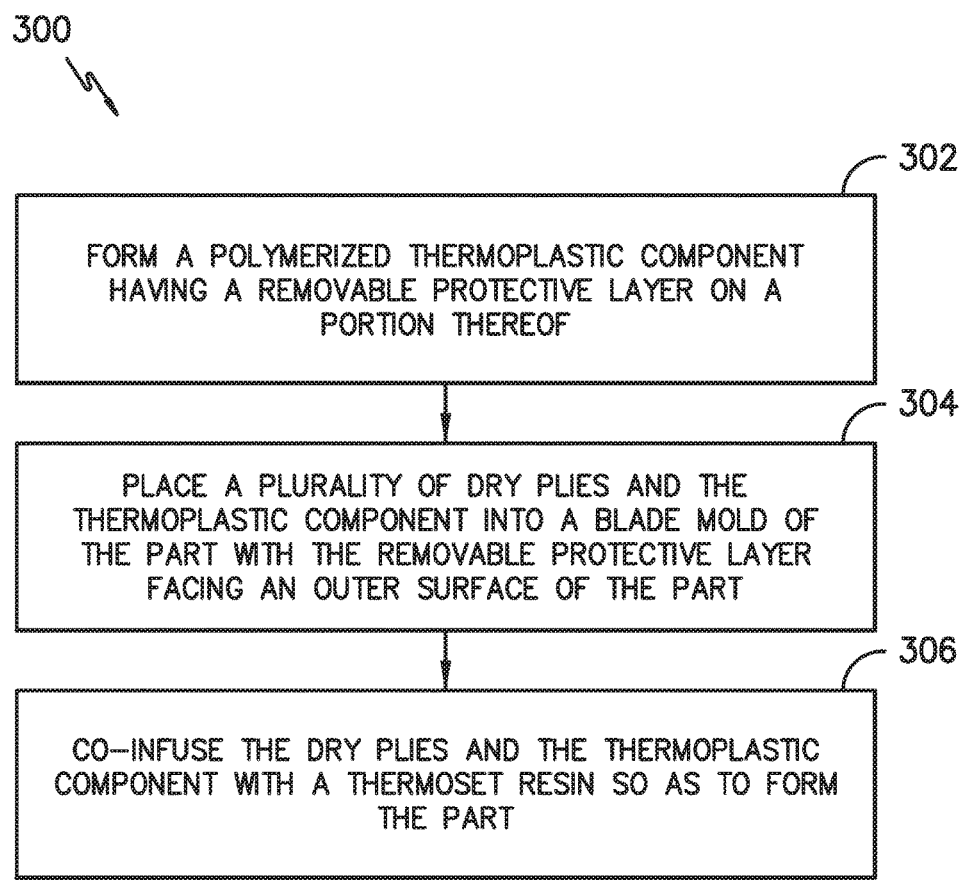
FIG. -10-

THERMOSET COMPONENT HAVING A WELDABLE THERMOPLASTIC INTERFACE

FIELD OF THE INVENTION

The present disclosure relates generally to wind turbine rotor blades, and more particularly to methods for manufacturing thermoset wind turbine rotor blades and/or blade components having weldable thermoplastic regions.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin. In addition, methods for manufacturing wind turbine rotor blades may include forming the rotor blades in blade segments. The blade segments may then be assembled to form the rotor blade.

For example, some modern rotor blades, such as those blades described in U.S. patent application Ser. No. 14/753,137 filed Jun. 29, 2105 and entitled "Modular Wind Turbine Rotor Blades and Methods of Assembling Same," which is incorporated herein by reference in its entirety, have a modular panel configuration. Thus, the various blade components of the modular blade can be constructed of varying materials based on the function and/or location of the blade component. More specifically, the blade segments may be constructed of a thermoplastic material and/or a thermoset material.

Methods of joining thermoset components to each other as well as to thermoplastic materials continue to be an issue. For example, joining predominately thermoset parts and/or joining a predominately thermoset part with a thermoplastic part conventionally requires the use of expensive adhesives and/or fasteners, both of which add weight and cost to the blade.

Thus, the art is continuously seeking new and improved rotor blades and related manufacturing methods that address the aforementioned issues.

BRIEF DESCRIPTION OF THE INVENTION

Aspects and advantages of the invention will be set forth in part in the following description, or may be obvious from the description, or may be learned through practice of the invention.

In one aspect, the present disclosure is directed a method for manufacturing a rotor blade of a wind turbine. The method includes forming a polymerized thermoplastic component for the rotor blade having a removable protective layer on a portion thereof. Another step includes placing a plurality of dry plies and the thermoplastic component into a blade mold of the rotor blade with the removable protective layer facing an outer surface of the rotor blade. The method also includes co-infusing the plurality of dry plies and the thermoplastic component with a resin material so as to form the rotor blade.

In one embodiment, the resin material may include a thermoset material. In another embodiment, the method may include removing the removable protective layer from the thermoplastic component and welding a thermoplastic blade component to the thermoplastic component of the rotor blade.

In further embodiments, the removable protective layer may include at least one of a peel ply, one or more disposable plies, a coating, an adhesive, or similar. More specifically, in certain embodiments, the removable protective layer may include a peel ply and one or more disposable plies configured atop the peel ply.

In such an embodiment, the method may include removing the one or more disposable plies and the removable protective layer before welding. In additional embodiments, the coating may include a releasing agent or a wax.

In another embodiment, the method may include controlling a welding temperature of the welding step such that the welding temperature is above a melting point of the thermoplastic component but below a melting temperature of the thermoset resin material of the rotor blade.

In one embodiment, the thermoset resin may include at least one of polyesters, polyurethanes, esters, epoxies, or similar. Further, the thermoplastic component may be constructed from at least one of styrenes, vinyls, cellulosics, polyesters, acrylics, polysulphones, imides, polyolefins, polyamides, fluropolymer, ethyl-methyl acrylate, polyesters, polycarbonates, acetals, or similar.

In another embodiment, the plurality of plies may include at least one fiber material. For example, in certain embodiments, the fiber material may include glass fibers, carbon fibers, polymer fibers, ceramic fibers, nanofibers, metal fibers, or similar.

In another aspect, the present disclosure is directed to a method for manufacturing a thermoset component having a weldable thermoplastic interface. The method includes forming a polymerized thermoplastic component having a removable protective layer on a portion thereof. Another step includes placing a plurality of dry plies and the thermoplastic component into a mold of the thermoset component with the removable protective layer facing an outer surface of the thermoset component mold. The method also includes co-infusing the plurality of dry plies and the thermoplastic component with a thermoset resin so as to form the thermoset component. It should be understood that the method may further include any of the additional step and/or features as described herein.

In yet another aspect, the present disclosure is directed to a thermoset component having a weldable thermoplastic interface. The thermoset component includes a predominately thermoset body having an outer surface and a polymerized thermoplastic component infused within the thermoset body so as to form the thermoplastic interface. The thermoset component also includes a removable protective layer configured on the thermoplastic interface. Thus, the removable protective layer is removable such that an additional thermoplastic component can be welded to the thermoplastic interface.

In one embodiment, the thermoset component may include a rotor blade of a wind turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade of a wind turbine according to the present disclosure;

FIG. 3 illustrates an exploded view of the modular rotor blade of FIG. 2;

FIG. 4 illustrates a cross-sectional view of one embodiment of a leading edge segment of a modular rotor blade according to the present disclosure;

FIG. 5 illustrates a cross-sectional view of one embodiment of a trailing edge segment of a modular rotor blade according to the present disclosure;

FIG. 6 illustrates a cross-sectional view of the modular rotor blade of FIG. 2 according to the present disclosure along line 6-6;

FIG. 7 illustrates a cross-sectional view of the modular rotor blade of FIG. 2 according to the present disclosure along line 7-7;

FIG. 8 illustrates a flow diagram of one embodiment of a method for manufacturing a rotor blade of a wind turbine according to the present disclosure;

FIG. 9 illustrates a schematic process flow diagram of one embodiment of a method for manufacturing a thermoset component having a weldable thermoplastic interface (e.g. a rotor blade of a wind turbine) according to the present disclosure; and FIG. 10 illustrates a flow diagram of one embodiment of a method for manufacturing a thermoset component having a weldable thermoplastic interface according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for manufacturing thermoset component, e.g. rotor blades for wind turbines, having one or more weldable thermoplastic interfaces. In one embodiment, the method includes forming a polymerized thermoplastic component having a removable protective layer on a portion thereof. Another step includes placing a plurality of dry plies and the thermoplastic component into a mold of the thermoset component with the removable protective layer facing an outer surface of the thermoset component mold. Thus, the method further includes co-infusing the dry plies and thermoplastic component with a resin material (e.g. a thermoset resin) so as to form the thermoset component having a weldable thermoplastic interface.

Thus, the present disclosure provides many advantages not present in the prior art. For example, the components of the present disclosure have weldable thermoplastic surfaces that can be easily welded to other thermoplastic components. Thus, the present disclosure provides a low-cost solution that allows rotor blades and similar components to be predominately formed of a cheaper resin material (i.e. a thermoset resin) and limits the potentially more expensive (or less capable in terms of strength) thermoplastic material to minor regions where welding is desired. Thus, the present disclosure can reduce and/or eliminate the need for bond paste, thereby reducing component cost and weight.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 constructed, at least in part, from a thermoset and/or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset and/or a thermoplastic material. In addition, as mentioned, the thermoplastic and/or the thermoset material as described herein may optionally be reinforced with a fiber material, including but not limited to glass fibers, carbon fibers, polymer fibers, ceramic fibers, nanofibers, metal fibers, or similar or combinations thereof. In addition, the direction of the fibers may include biaxial, unidirectional, triaxial, or any other another suitable direction and/or combinations thereof. Further, the fiber content may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 40 of the rotor blade 16 and a trailing edge 42 of the rotor blade 16. As is generally understood, the chord 25 may generally vary in length with respect to the span 23 as the rotor blade 16 extends from the blade root section 20 to the blade tip section 22.

Referring particularly to FIGS. 2-7, any number of blade segments 21 having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade segments 21 may be constructed of any suitable materials, including but not limited to a thermoset material or a thermoplastic material optionally reinforced with one or more fiber materials. More specifically, in certain embodiments, the blade segments 21 may include any one of or combination of the following blade segments: pressure and/or suction side segments 44, 46, (FIGS. 2 and 3), leading and/or trailing edge segments 24, 26 (FIGS. 2-6), a non-jointed segment, a single-jointed segment, a multi-jointed blade segment, a J-shaped blade segment, or similar.

More specifically, as shown in FIG. 4, the leading edge segments 24 may have a forward pressure side surface 28 and a forward suction side surface 30. Similarly, as shown in FIG. 5, each of the trailing edge segments 26 may have an aft pressure side surface 32 and an aft suction side surface 34. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16. In addition, as particularly shown in FIG. 6, the leading edge segment(s) 24 and the trailing edge segment(s) 26 may be joined at a pressure side seam 36 and a suction side seam 38. For example, the blade segments 24, 26 may be configured to overlap at the pressure side seam 36 and/or the suction side seam 38. Further, as shown in FIG. 2, adjacent blade segments 24, 26 may be configured to overlap at a seam 54. Thus, where the blade segments are constructed at least partially of a thermoplastic material, adjacent blade segments 21 can be welded together along the seams 36, 38, 54, which will be discussed in more detail herein. Alternatively, in certain embodiments, the various segments of the rotor blade 16 may be secured together via an adhesive 56 (or mechanical fasteners) configured between the overlapping leading and trailing edge segments 24, 26 and/or the overlapping adjacent leading or trailing edge segments 24, 26.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In addition, the spar caps 48, 50, 51, 53 may be constructed of any suitable materials, e.g. a thermoplastic or thermoset material or combinations thereof. Further, the spar caps 48, 50, 51, 53 may be pultruded from thermoplastic or thermoset resins. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 48, 50, 51, 53 may be formed of the same pre-cured composites or different pre-cured composites. In addition, the pultruded components may be produced from rovings, which generally encompass long and narrow bundles of fibers that are not combined until joined by a cured resin.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 24, 26 can be mounted thereto.

Referring now to FIGS. 8 and 9, various embodiments of manufacturing a rotor blade, e.g. the modular rotor blade 16 as described herein, are illustrated. For example, as shown in FIG. 8, a flow diagram of one embodiment of a method 200 for manufacturing a rotor blade 16 or a rotor blade component 100 of a wind turbine 10 according to the present disclosure is illustrated, whereas FIG. 9 illustrates a schematic process flow diagram of one embodiment for manufacturing the rotor blade 16 according to the present disclosure. As shown at 202, the method 200 includes forming or producing a polymerized thermoplastic component 102 (e.g. equivalent to curing in thermoset components) for the rotor blade 16 having a removable protective layer 104 on a portion thereof. For example, in certain embodiments, the removable protective layer 102 may include a peel ply 105, one or more disposable plies 107, a coating, an adhesive, or similar or any combinations thereof. Further, the coating as described herein may include a releasing agent and/or a wax. Moreover, the adhesive described herein may include tape or similar. More specifically, as shown in FIGS. 9(A) and (B), the removable protective layer 104 may include a peel ply 105 and a plurality of disposable plies 107 configured atop the peel ply 105.

Referring back to FIG. 8, as shown at 204, the method 200 also includes placing a plurality of dry plies 112 and the thermoplastic component 102 into a blade mold 106 of the rotor blade 16 or rotor blade component with the removable protective layer 104 facing (or aligned with) an outer surface 108 of the rotor blade 16. In another embodiment, the dry plies 112 may include at least one fiber material. For example, in certain embodiments, the fiber material may include glass fibers, carbon fibers, polymer fibers, ceramic fibers, nanofibers, metal fibers, or any other suitable fibers or fiber bundles.

As shown at 206, the method 200 further includes co-infusing the plurality of dry plies 112 and the thermoplastic component 100 with a thermoset resin 114 so as to form the rotor blade 16. The component is then allowed to cure. More specifically, as shown in FIGS. 9(B) and (C), the final thermoset component includes a thermoset body 103 with the polymerized thermoplastic component 102 infused therein so as to form the thermoplastic interface 109 when the protective layer 104 is removed. More specifically, as shown, the protective layer 104 faces the exterior of the thermoset component mold, such that when removed, a weldable thermoplastic interface 109 remains therebeneath. Accordingly, the protective layer 104 is configured to prevent the weldable thermoplastic interface 109 from being contaminated by the thermoset resin during co-infusion. Thus, as shown in FIGS. 9(C) and (D), the method 200 may also include removing the removable protective layer 104 from the thermoplastic component 102 that was co-infused with the rotor blade 16 and welding a thermoplastic blade component 110 to the thermoplastic component 102 of the rotor blade 16. In such an embodiment, the method 200 may include removing the disposable plies 107 and the peel ply 105 before welding.

The presence of non-thermoplastic material (e.g. thermoset material) at the weld interface 109 reduces weld quality and ultimately reduces the strength of the weld. As such, once the protective layer 104 is removed after co-infusion, thermoplastic welding between non-contaminated thermoplastic surfaces can take place.

In further embodiments, the method 200 may include controlling a welding temperature of the welding step such that the welding temperature is above a melting point of the thermoplastic component but below a melting temperature of the thermoset resin material of the rotor blade. More specifically, depending on the resin matrix and chemistry of the rotor blade 16, the melting point of each may be relatively close to each other. In such embodiments, the method 200 may include tailoring the core material to have a higher melting point versus thermoplastic resin matrix so as to avoid such an issue.

The thermoplastic components and/or materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, flluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset components and/or materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Referring now to FIG. 10, a flow diagram of one embodiment of a method 300 for manufacturing a thermoset component having a weldable thermoplastic interface is illustrated. As shown at 302, the method 300 includes forming a polymerized thermoplastic component having a removable protective layer on a portion thereof. As shown at 304, the method 300 includes placing a plurality of dry plies and the thermoplastic component into a mold of the thermoset component with the removable protective layer facing an outer surface of the thermoset component mold. As shown at 306, the method 300 includes co-infusing the plurality of dry plies and the thermoplastic component with a thermoset resin so as to form the thermoset component. Such method can be used for a rotor blade and/or rotor blade components, as well as any other component that can benefit from having a thermoplastic weldable surface for joining similar thermoplastic components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a rotor blade of a wind turbine, the method comprising:
   forming a polymerized thermoplastic component for the rotor blade having a removable protective layer on a portion thereof;
   placing a plurality of dry plies and the thermoplastic component into a blade mold of the rotor blade with the removable protective layer facing an outer surface of the rotor blade;
   co-infusing the plurality of dry plies and the thermoplastic component with a resin material so as to form the rotor blade;
   removing the removable protective layer from the thermoplastic component; and
   welding an additional thermoplastic blade component to the thermoplastic component of the rotor blade.

2. The method of claim 1, wherein the resin material comprises a thermoset material.

3. The method of claim 1, wherein the removable protective layer comprises at least one of a peel ply, one or more disposable plies, a coating, or an adhesive.

4. The method of claim 3, wherein the removable protective layer comprises a peel ply and one or more disposable plies configured atop the peel ply.

5. The method of claim 4, further comprising removing the one or more disposable plies and the removable protective layer before welding.

6. The method of claim 3, wherein the coating comprises a releasing agent.

7. The method of claim 1, wherein the thermoset resin comprises at least one of polyesters, polyurethanes, esters, or epoxies.

8. The method of claim 1, wherein the thermoplastic component is constructed from at least one of styrenes, vinyls, cellulosics, polyesters, acrylics, polysulphones, imides, polyolefins, polyamides, fluropolymer, ethyl-methyl acrylate, polyesters, polycarbonates, or acetals.

9. The method of claim 1, wherein the plurality of dry plies comprise at least one fiber material, wherein the fiber material comprises at least one of glass fibers, carbon fibers, polymer fibers, ceramic fibers, nanofibers, or metal fibers.

10. A method for manufacturing a thermoset component having a weldable thermoplastic interface, the method comprising:
    forming a polymerized thermoplastic component having a removable protective layer on a portion thereof;
    placing a plurality of dry plies and the thermoplastic component into a mold of the thermoset component with the removable protective layer facing an outer surface of the thermoset component mold;
    co-infusing the plurality of dry plies and the thermoplastic component with a thermoset resin so as to form the thermoset component;
    removing the removable protective layer from e thermoplastic component; and
    welding a thermoplastic component to the thermoplastic component of the thermoset component.

11. The method of claim 10, wherein the removable protective layer comprises at least one of a peel ply, one or more disposable plies, a coating, or an adhesive.

12. The method of claim 11, wherein the removable protective layer comprises a peel ply and one or more disposable plies configured atop the peel ply.

13. The method of claim 12, further comprising removing the one or more disposable plies and then removing the removable protective layer before welding.

14. The method of claim 11, wherein the coating comprises a releasing agent.

15. The method of claim 10, wherein the thermoset component comprises a rotor blade.

16. The method of claim 10, wherein the plurality of dry plies comprise at least one fiber material, wherein the fiber material comprises at least one of glass fibers, carbon fibers, polymer fibers, ceramic fibers, nanofibers, or metal fibers.

* * * * *